US005975218A

United States Patent [19]

Liau

[11] Patent Number: 5,975,218
[45] Date of Patent: Nov. 2, 1999

[54] MULTI-USAGE CONNECTING MECHANISM OF PNEUMATIC TOOL

[75] Inventor: Yeong-Feng Liau, Taichung, Taiwan

[73] Assignee: I Lin Air Tools Co., Ltd., Taichung Hsien, Taiwan

[21] Appl. No.: 09/108,226

[22] Filed: Jul. 1, 1998

[51] Int. Cl.[6] .............................. B23B 45/02; H02K 7/14

[52] U.S. Cl. .............................................. 173/216; 173/217

[58] Field of Search ..................................... 173/216, 217, 173/171; 310/47, 50, 83; 475/297, 298

[56] References Cited

U.S. PATENT DOCUMENTS

| | | | |
|---|---|---|---|
| 4,898,249 | 2/1990 | Ohmori | 173/217 |
| 5,339,908 | 8/1994 | Yokota et al. | 173/216 |
| 5,550,416 | 8/1996 | Fanchang et al. | 310/50 |
| 5,624,000 | 4/1997 | Miller | 173/217 |

*Primary Examiner*—Scott A. Smith
*Attorney, Agent, or Firm*—Rosenberg, Klein & Bilker

[57] ABSTRACT

A multi-usage connecting mechanism of pneumatic tool, including a connecting member and a supporting member. One end of the connecting member is formed with a right polygonal stem and the connecting member is formed with a through hole about an axis thereof. An annular groove is formed on the connecting member between two ends thereof. A circular tube extends from one end of the stem of the connecting member along the axis thereof. An inner side of the circular tube is formed with inner thread screwing with outer thread of the supporting member. The supporting member is a circular tube member. Bearings are disposed in the supporting member. One end of the supporting member is formed with outer thread. The other end of the supporting member is formed with a stopper section for stopping the bearings.

6 Claims, 5 Drawing Sheets

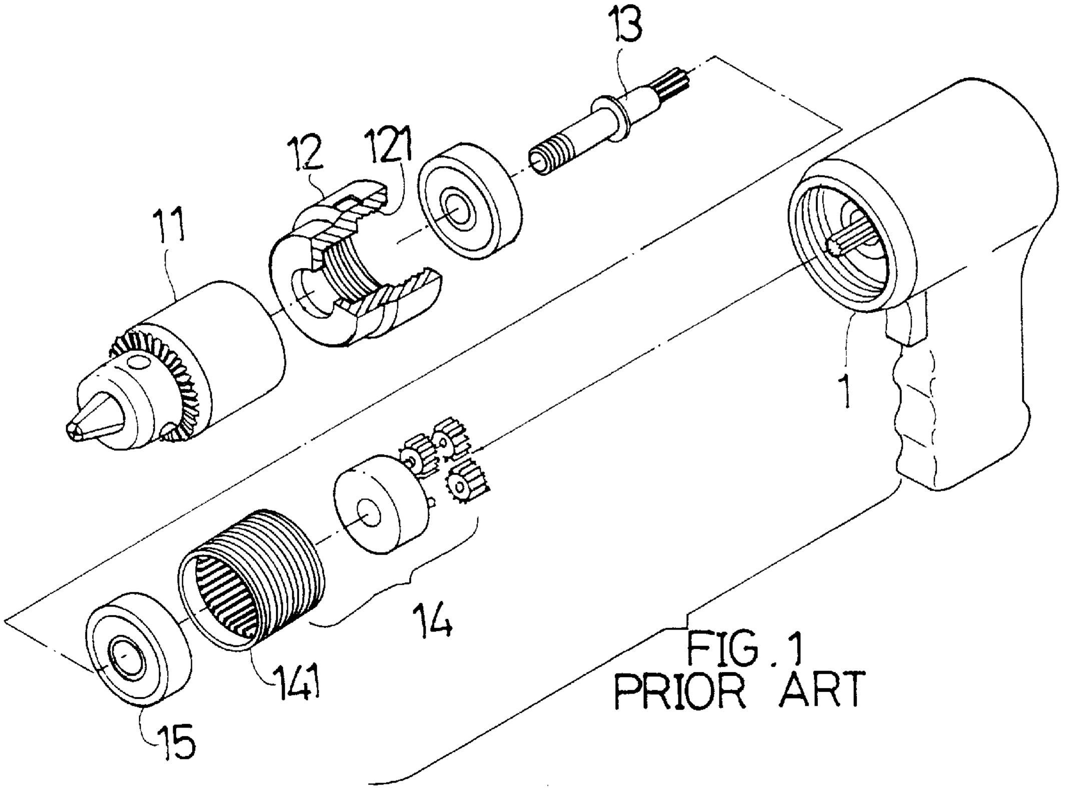
FIG. 1
PRIOR ART
FIG. 2
PRIOR ART
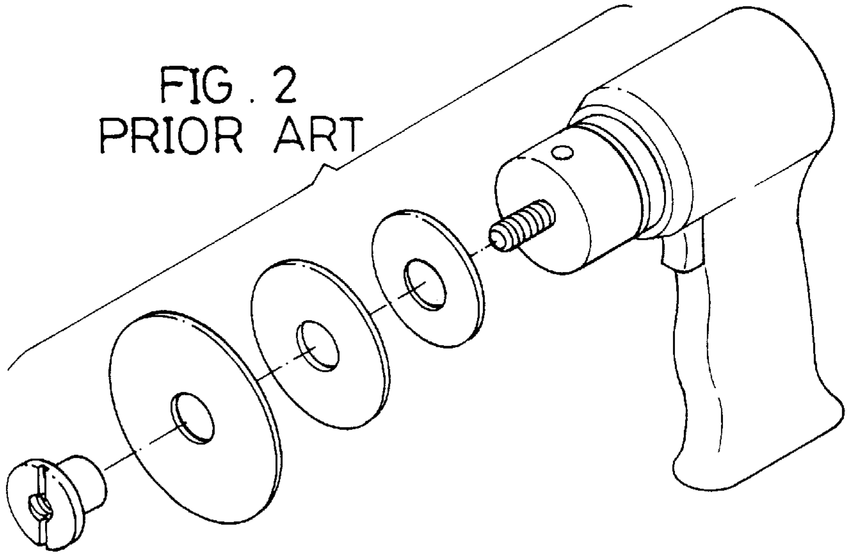

MULTI-USAGE CONNECTING MECHANISM OF PNEUMATIC TOOL

BACKGROUND OF THE INVENTION

The present invention relates to a multi-usage connecting mechanism of pneumatic tool, which is applicable to various kinds of pneumatic tool heads so as to save cost and facilitate operation.

Various kinds of pneumatic tools are commercially available nowadays, including pneumatic cutting machine, pneumatic shear for shearing metal board, pneumatic waxing machine, pneumatic drill, pneumatic screwdriver, pneumatic wrench, etc. Each kind of tool head necessitates a cooperative pneumatic motor. For example, FIG. 1 shows a conventional pneumatic drill in which the tool head 11 is connected to the pneumatic motor 1 via a connecting member 12, a transmission shaft 13, a planet gear set 14 and multiple bearings 15. The inner thread 121 of the connecting member 12 is screwed with outer side of one end of a ring gear 141 of the planet gear set 14. The other end of the ring gear 141 is secured to the pneumatic motor 1. Such connecting mechanism of the pneumatic drill cannot be applied to other pneumatic tool such as a pneumatic grinder as shown in FIG. 2 due to different structure for connecting the tool head with the pneumatic motor. Therefore, it is necessary to purchase one specific tool head in accordance with each kind of pneumatic motor. As a result, the expense is high and money is wasted.

SUMMARY OF THE INVENTION

It is therefore a primary object of the present invention to provide a multi-usage connecting mechanism of pneumatic tool which is applicable to various kinds of pneumatic tool heads so as to facilitate operation. Moreover, it is no more necessary to purchase many kinds of expensive pneumatic tools and cooperative pneumatic motors so as to save cost.

The present invention can be best understood through the following description and accompanying drawings, wherein:

BRIEF DESCRIPTION OF THE DRAWINGS

FIG. 1 is a perspective exploded view of a conventional pneumatic drill,

FIG. 2 is a perspective exploded view of a conventional pneumatic grinder;

DETAILED DESCRIPTION OF THE PREFERRED EMBODIMENTS

Figure 3:
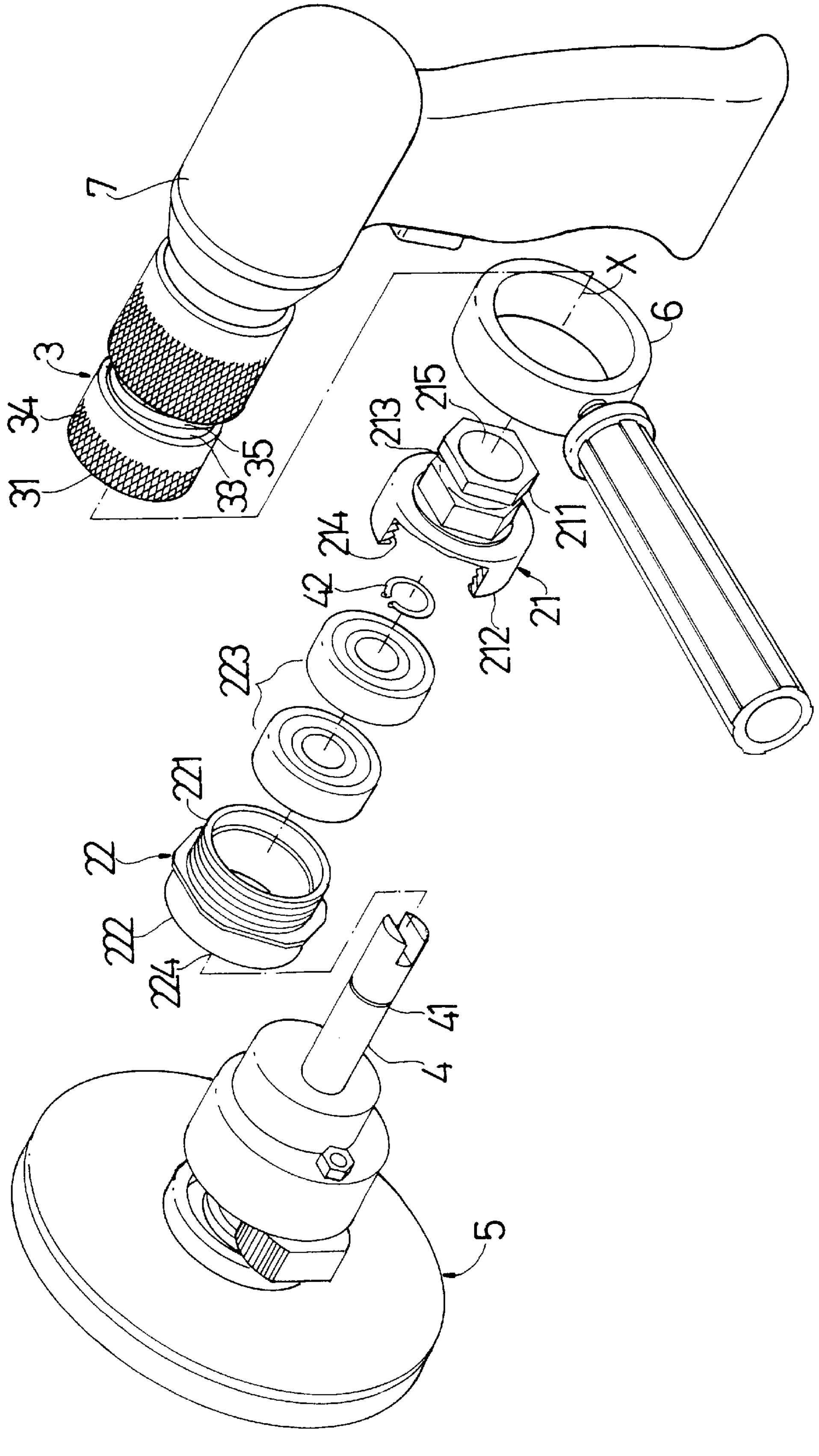
FIG. 3 is a perspective exploded view of a first embodiment of the present invention.
Figure 4:
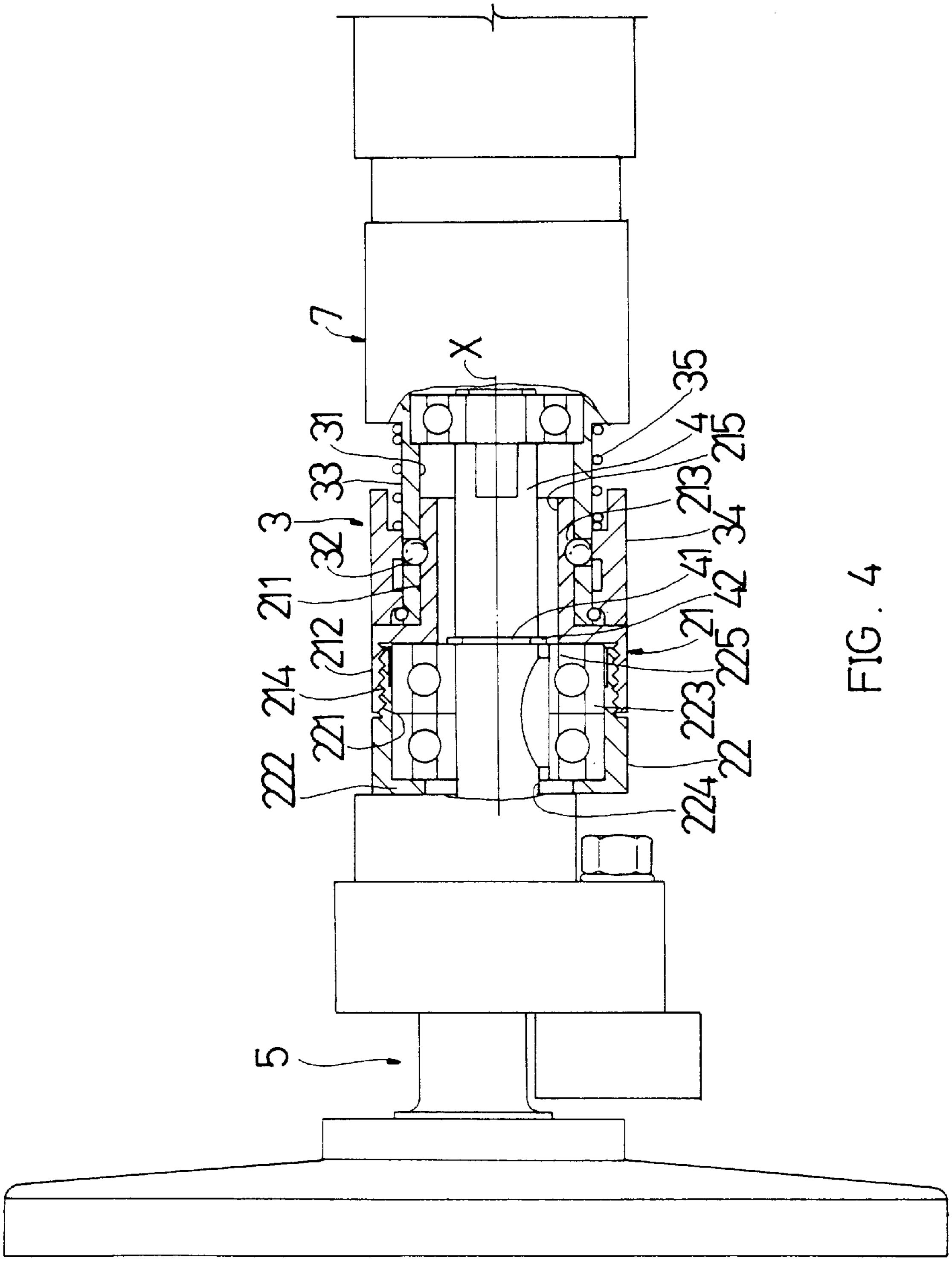
FIG. 4 is a sectional assembled view of the first embodiment of the present invention.

Please refer to FIGS. 3 and 4. A connecting mechanism of the present invention includes a connecting member 21 and a supporting member 22 The connecting member 21 includes a first section 211 and a second section 212. The first section 211 is a hexagonal stem. An annular groove 213 is formed on the first section 211 between two ends thereof. An engaging ball member 32 of a fast connector 3 is engaged in the annular groove 213. One end of the first section 211 integrally connected with the second section 212 extending along the axis X of the first section 211. The second section 212 is a circular tube having an outer diameter slightly larger than that of the first section 211. The inner side of the second section 212 is formed with inner thread 214 for tightening the connecting member 21 with the supporting member 22. The connecting member 21 is formed with a through hole 215 about the axis X. The through hole 215 has an outer diameter larger than that of the transmission shaft 4.

The supporting member 22 is a tubular member one end of which is formed with outer thread 221 for screwing with the inner thread 214 of the connecting member 21. The other end of the supporting member 22 distal from the outer thread 221 is disposed with an inward extending stopper section 222. The stopper section 222 is formed with a central hole 224 having a diameter larger than that of the transmission shaft 4

The inner side of the supporting member 22 is disposed with two bearings 223. The inner diameter of the bearing 223 is slightly larger than the outer diameter of the transmission shaft 4. The transmission shaft 4 is formed with an annular groove 41 between the bearings 223 and the connecting member 21. A latch ring 42 is latched in the annular groove 41 for preventing the connecting mechanism from axial moving.

The connecting mechanism of the present invention is connected with the pneumatic motor 7 via the fast connector 3. The fast connector 3 is a circular tube body formed with a right hexagonal socket 31 for inserting the first section 211 of the connecting member 21 therein. Two opposite sides of the socket 31 are respectively disposed with two engaging ball members 32 between two ends of the fast connector 3. A sliding ring 34 is disposed around outer side 33 of the fast connector 3. The sliding ring 34 is urged by a spring 35 which enables the sliding ring 34 to restore to its home position and press the engaging ball members 32.

According to a first embodiment of the present invention, the connecting mechanism is applied to a pneumatic waxing machine. The transmission shaft 4 of the tool head 5 is fitted into the two bearings 223 of the supporting member 22 and locked by the latch ring 42 and coupled with the connecting member 21. In use, a user only needs to fit the first section 211 of the connecting member 21 into the fast connector 3 for operation. When it is necessary to replace the tool head 5, the user only needs to slide the sliding ring 34 of the fast connector 3 backward for the replacement.

In addition, in operation, because the tool head 5 of the pneumatic waxing machine has a very fast rotary speed and very great power, the tool head 5 is subject to vibration. In order to avoid affection on the operation by such vibration, a handle 6 as shown in FIG. 3 is disposed on outer side of the second section 212 of the connecting member 21 so as to stabilize the operation and facilitate holding.

According to the above arrangement, only by means of the pneumatic motor 7 and the connecting mechanism coupled with the tool head 5, in use, the tool head 5 can be quickly replaced to save time and cost and make the operation more convenient.

Figure 5:
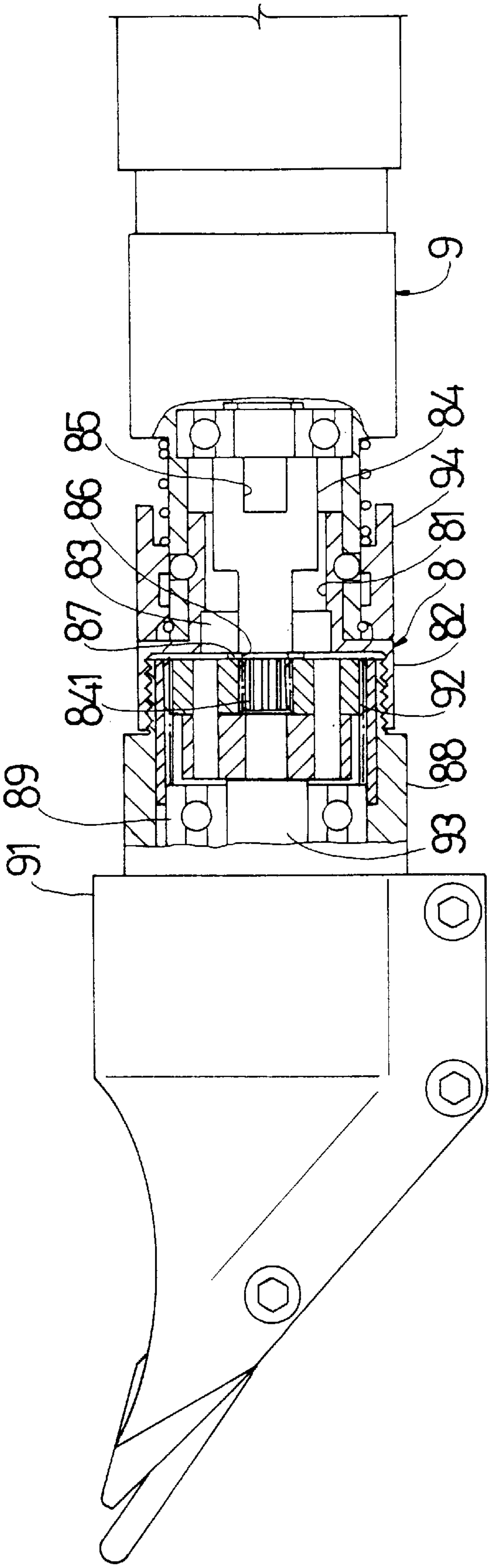
FIG. 5 is a sectional assembled view of a second embodiment of the present invention.
Figure 6:
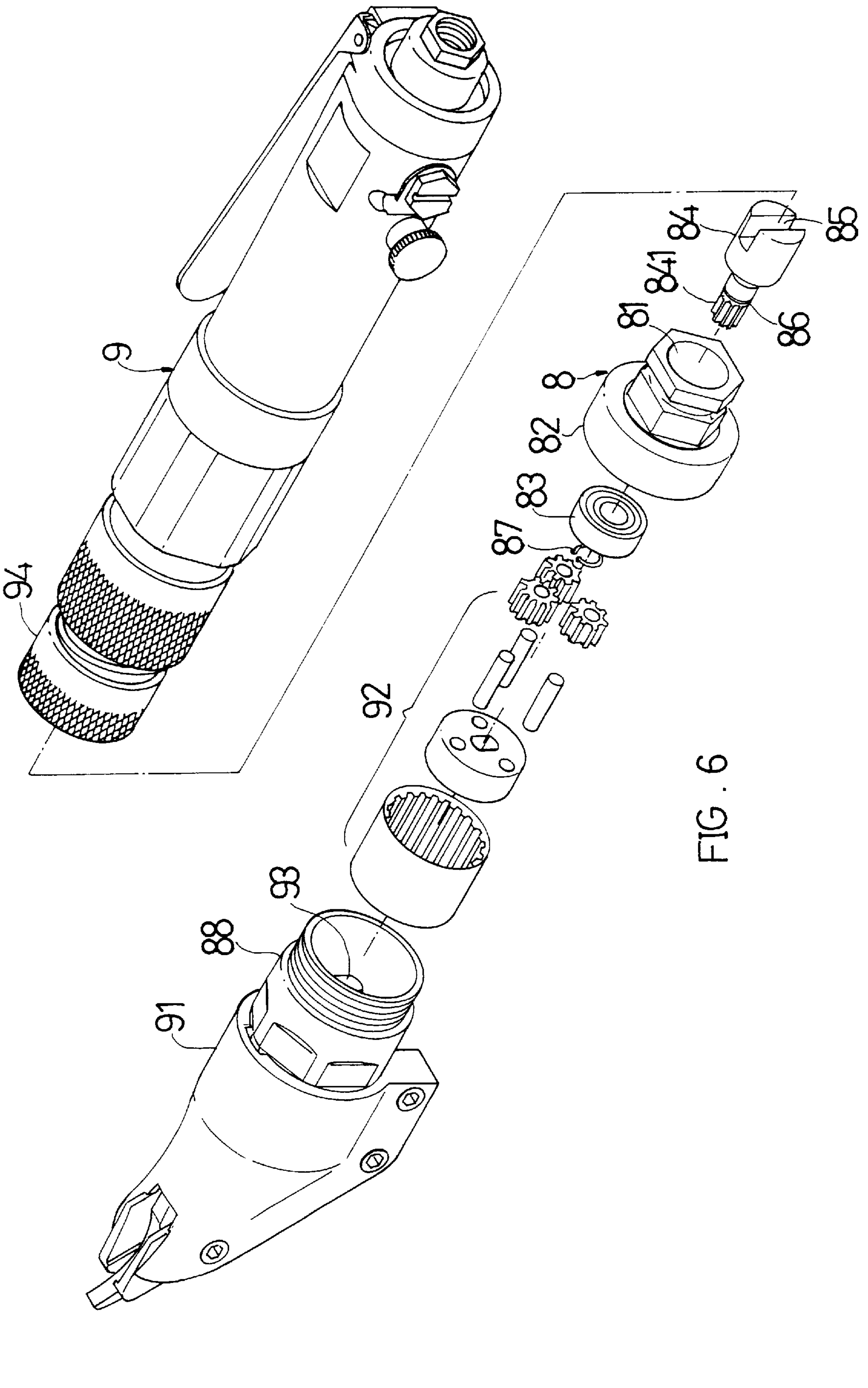
FIG. 6 is a perspective exploded view of the second embodiment of the present invention.

FIGS. 5 and 6 show a second embodiment of the present invention, in which a bearing 83 is disposed in the through hole 81 of the connecting member 8 near the second section 82. A transmission shaft 84 is rotatably disposed in the bearing 83 and spaced from the tool head 91. One end of the transmission shaft 84 is formed with a socket 85 for the pneumatic motor 9 to drive the transmission shaft 84. The other end of the transmission shaft 84 distal from the socket 85 is disposed with a sun gear 841 of a planet gear set 92. An annular groove 86 is formed on the transmission shaft 84 between two ends thereof near the sun gear 841. A latch ring 87 is disposed at the annular groove 86 and stopped by the bearing 83 so as to prevent the transmission shaft 84 from axial displacement. The reducing planet gear set 92 is disposed between the bearings 89 of the supporting member 88 and the bearing 83. The planet gear set 92 via a shaft 93 outputs power to the tool head 91.

The second embodiment of the present invention is applicable to those tool heads 91 having a reducing planet gear set 92 or those tool heads 91 which are not directly driven. FIGS. 5 and 6 show that the second embodiment of the present invention is applied to a pneumatic shear. The connecting member 21 is fitted in the fast connector 94 of the pneumatic motor 9. The sun gear 841 of the transmission shaft 84 is engaged with the planet gear set 92, whereby a reducing effect is provided for the power transmission from the sun gear 841 to the tool head 91 of the pneumatic shear. Accordingly, in use of the present invention, the connecting mechanism can be modified in accordance with the working properties and the transmission features of the tool head 91.

It is to be understood that the above description and drawings are only used for illustrating some embodiments of the present invention, not intended to limit the scope thereof. Any variation and derivation from the above description and drawings should be included in the scope of the present invention.

What is claimed is:

1. A multi-usage connecting mechanism of pneumatic tool, comprising a connecting member and a supporting member, one end of the connecting member being formed with a right polygonal stem and the connecting member being formed with a through hole about an axis thereof, an annular groove being formed on the connecting member between two ends thereof, wherein a circular tube extends from one end of the stem of the connecting member along the axis thereof, an inner side of the circular tube being formed with inner thread screwing with outer thread of the supporting member, the supporting member being a circular tube member, bearings being disposed in the supporting member, a transmission shaft being fitted in the bearings, one end of the supporting member being formed with outer thread, the other end of the supporting member being formed with a stopper section for stopping the bearings.

2. A connecting mechanism as claimed in claim 1, wherein the transmission shaft is formed with an annular groove between the bearings and the connecting member, a latch ring being latched in the annular groove.

3. A connecting mechanism as claimed in claim 1, wherein a bearing is disposed in the through hole of the polygonal stem near the circular tube for supporting the transmission shaft.

4. A connecting mechanism as claimed in claim 1, wherein the connecting member is connected with a pneumatic motor via a fast connector, the fast connector being formed with a right hexagonal socket, two opposite sides of the socket being respectively disposed with two engaging ball members, a sliding ring being disposed around outer side of the fast connector and urged by a spring.

5. A connecting mechanism as claimed in claim 1, wherein a handle is disposed on outer side of the circular tube of the connecting member.

6. A connecting mechanism as claimed in claim 1, wherein a reducing planet gear set is disposed in the supporting member.

* * * * *